US009099055B2

(12) United States Patent
Kim et al.

(10) Patent No.: US 9,099,055 B2
(45) Date of Patent: Aug. 4, 2015

(54) DISPLAY DRIVING DEVICE AND DISPLAY SYSTEM WITH IMPROVED PROTECTION AGAINST ELECTROSTATIC DISCHARGE

(75) Inventors: Hyung-tae Kim, Hwaseong-si (KR); Ji-woon Jung, Seoul (KR); Jeong-ah Ahn, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 290 days.

(21) Appl. No.: 13/611,699

(22) Filed: Sep. 12, 2012

(65) Prior Publication Data

US 2013/0120334 A1 May 16, 2013

(30) Foreign Application Priority Data

Nov. 10, 2011 (KR) ........................ 10-2011-0117160

(51) Int. Cl.
*G06F 3/038* (2013.01)
*G09G 5/00* (2006.01)
*G09G 3/36* (2006.01)

(52) U.S. Cl.
CPC .......... *G09G 3/3688* (2013.01); *G09G 2330/04* (2013.01)

(58) Field of Classification Search
USPC .......................................... 345/204, 208, 212
See application file for complete search history.

(56) References Cited

U.S. PATENT DOCUMENTS 7,057,411 B2 * 6/2006 Her et al. ................. 324/756.04
2003/0098859 A1 * 5/2003 Udo et al. ..................... 345/204
2006/0109392 A1 * 5/2006 Park ................................ 349/40
2009/0015297 A1 * 1/2009 Chen et al. ..................... 327/108
2010/0188374 A1 * 7/2010 Chen et al. .................... 345/204
2011/0169813 A1 * 7/2011 Jin et al. ........................ 345/212
2012/0086679 A1 * 4/2012 Hwang et al. ................. 345/204

FOREIGN PATENT DOCUMENTS

JP 2007-058177 A 3/2007
KR 10-2002-0044420 A 6/2002
KR 10-2006-0076034 A 7/2006
KR 10-2007-0083083 A 8/2007

* cited by examiner

*Primary Examiner* — Kwang-Su Yang
(74) *Attorney, Agent, or Firm* — Lee & Morse, P.C.

(57) ABSTRACT

A display driving device a driving unit, an output unit, and an output control unit. The driving unit includes a first buffer and a second buffer generating a first driving voltage and a second driving voltage, respectively. The output unit includes a first output pad and a second output pad to which voltages are respectively applied via first second data driving paths, respectively, and which output the voltages to outside. The output control unit includes a charge share path that connects the first output pad and the second output pad. Each of the first data driving path and the second data driving path includes a first electro-static discharge (ESD) protection element, and the charge share path includes a second ESD protection element that is disposed separately from the first data driving path and the second data driving path.

20 Claims, 15 Drawing Sheets

DISPLAY DRIVING DEVICE AND DISPLAY SYSTEM WITH IMPROVED PROTECTION AGAINST ELECTROSTATIC DISCHARGE

CROSS-REFERENCE TO RELATED APPLICATIONS

The present application claims priority under 35 U.S.C. §119(a) to Korean Patent Application No. 10-2011-0117160, filed on Nov. 10, 2011, in the Korean Intellectual Property Office, and entitled: "Display Driving Device and Display System with Improved Function of Protecting Against Electrostatic Discharge," which is incorporated by reference herein in its entirety.

BACKGROUND

1. Field

The inventive concept relates to a semiconductor device, and more particularly, to a display driving device with an improved function of protecting against electrostatic discharge (ESD) and an improved charge share function, and a display system including the display driving device.

2. Description of the Related Art

As semiconductor chips become more highly integrated, more static electricity is generated from fine wirings via pads, and thus, the semiconductor chips are damaged. An ESD protection circuit or an ESD protection element is provided to prevent damage to elements of internal circuits of the semiconductor chips by ESD. The ESD protection circuit generally includes a resistor, a diode, a bipolar junction transistor (BJT), and the like. However, in general display driving devices, resistance of an ESD protection resistor that is disposed on an output pad directly affects output characteristics of the general display driving devices. When resistance of the ESD protection resistor is increased, output waveforms of the display driving device are not good and heat dissipation of the display driving device becomes severe, and thus, output characteristics of the display driving device are lowered. On the other hand, when resistance of the ESD protection resistor is decreased, output characteristics of the display driving device are improved, but a function of protecting against ESD is reduced. Thus, a display driving device with an improved function of protecting against ESD and improved output characteristics is required.

SUMMARY

According to an aspect of the inventive concept, there is provided a display driving device including: a driving unit including a first buffer and a second buffer, wherein the first buffer and the second buffer generate a first driving voltage and a second driving voltage, respectively; an output unit including a first output pad and a second output pad to which voltages are respectively applied and which output the voltages to outside; a first data driving path and a second data driving path via which the first driving voltage and the second driving voltage are applied to the first output pad and the second output pad, respectively; and an output control unit including a charge share path that connects the first output pad and the second output pad, wherein each of the first data driving path and the second data driving path includes a first electro-static discharge (ESD) protection element, and the charge share path includes a second ESD protection element that is disposed separately from the first data driving path and the second data driving path.

The first ESD protection element and the second ESD protection element may include resistors.

Resistance of the second ESD protection element may be equal to or greater than resistance of the first ESD protection element.

Resistance of the second ESD protection element may be variable.

Each of the first data driving path and the second data driving path may include an output control switch that is turned on in a first operating period or a test period in response to an output control signal, and the charge share path may include a first share switch that is turned on in a second operating period in response to a charge share signal.

The charge share path may include two second ESD protection elements and a first share switch, and one end of each of the two second ESD protection element may be connected to the first output pad and the second output pad, and the other end of each second ESD protection element may be connected to the first share switch.

The first data driving path may be connected between the first buffer and the first output pad, and the second data driving path may be connected between the second buffer and the second output pad, and each of the first data driving path and the second data driving path may include an output control switch and a first ESD protection element that are connected in series.

Each of the first data driving path and the second data driving path may include at least two pairs of an output control switch and a first ESD protection element that are connected in series.

The output control unit may further include: a third data driving path via which the first driving voltage is applied to the second output pad; and a fourth data driving path via which the second driving voltage is applied to the first output pad, and the third data driving path and the second data driving path share the first ESD protection element of the second data driving path, and the fourth data driving path and the first data driving path share and the first ESD protection element of the first data driving path.

The output control unit may further include: a first channel shift path via which the first driving voltage is applied to a first test pad; a second channel shift path via which the second driving voltage is applied to a second test pad; and a second charge share path for connecting the first channel shift path and the second channel shift path.

Each of the first channel shift path and the second channel shift path may include a channel shift switch that is turned on in a test period and a second operating period in response to a channel shift signal, and the second charge share path may include a share switch that is turned on in the second operating period.

Each of the first output pad and the second output pad may include: an output pin for connecting an internal circuit and an external circuit; a first ESD protection diode that is connected between the output pin and a first power supply voltage; and a second ESD protection diode that is connected between the output pin and a second power supply voltage.

According to another aspect of the inventive concept, there is provided a display system including: a display panel in which a plurality of scan lines and a plurality of data lines cross one another in a vertical direction and a switching element and a pixel cell electrode are arranged at each portion where the plurality of scan lines and the plurality of data lines cross one another; a scan driving unit for applying scan signals to the plurality of scan lines; and a data driving unit for applying driving voltages to the plurality of data lines, wherein the data driving unit includes: a plurality of buffers for generating and outputting driving voltages; a plurality of output pads to which voltages are applied and which output the voltages to the plurality of data lines; a plurality of data driving paths via which the driving voltages that are output from the plurality of buffers, respectively, are applied to the output pads in a data driving period or a test period; a plurality of channel shift paths via which the driving voltages that are output from the plurality of buffers, respectively, are applied to test pads in the test period; a plurality of first charge share paths for connecting the plurality of output pads to each other in a charge share period; and a plurality of second charge share paths for connecting a pair of adjacent channel shift paths among the plurality of channel shift paths.

Each of the plurality of channel shift paths may include a channel shift switch that is turned on in a test period or a charge share period in response to a channel shift signal, and each of the plurality of first charge share paths may include a first share switch that is turned on in the charge share period in response to a charge share signal, and each of the plurality of second charge share paths may include a second share switch that is turned on in the charge share period in response to the charge share signal.

The plurality of channel shift paths, the plurality of first charge share paths, and the plurality of second charge share paths may include switches, respectively, and the switches may be turned on in the charge share period and may perform a charge share function.

According to another aspect of the inventive concept, there is provided a display driving device including a driving unit generating a first driving voltage and a second driving voltage; an output unit including a first output pad and a second output pad to which voltages are respectively applied and which output the voltages to outside; a first data driving path and a second data driving path via which the first driving voltage and the second driving voltage are applied to the first output pad and the second output pad, respectively; and an output control unit including a charge share path that connects the first output pad and the second output pad, wherein the charge share path includes an electro-static discharge (ESD) protection element disposed outside the first data driving path and the second data driving path.

The charge share path may include two ESD protection elements and a first share switch, a first end of each of the two second ESD protection element being connected to the first output pad and the second output pad, and a second end of each second ESD protection element being connected to the first share switch.

The output control unit may include a first channel shift path via which the first driving voltage is applied to a first test pad in the output unit; a second channel shift path via which the second driving voltage is applied to a second test pad in the output unit; and a second charge share path for connecting the first channel shift path and the second channel shift path.

Each of the first channel shift path and the second channel shift path may include a channel shift switch that is turned on in a test period and a second operating period in response to a channel shift signal. Each of the first charge share path and the second charge share path may include a share switch that is turned on in the second operating period.

The display driving device may include an ESD in each of the first and second data driving paths, the ESD in the charge share path having a higher resistance than that of ESDs in the first and second data driving paths.

BRIEF DESCRIPTION OF THE DRAWINGS

Features will become apparent to those of ordinary skill in the art by describing in detail exemplary embodiments with reference to the attached drawings in which.

DETAILED DESCRIPTION

Figure 1:
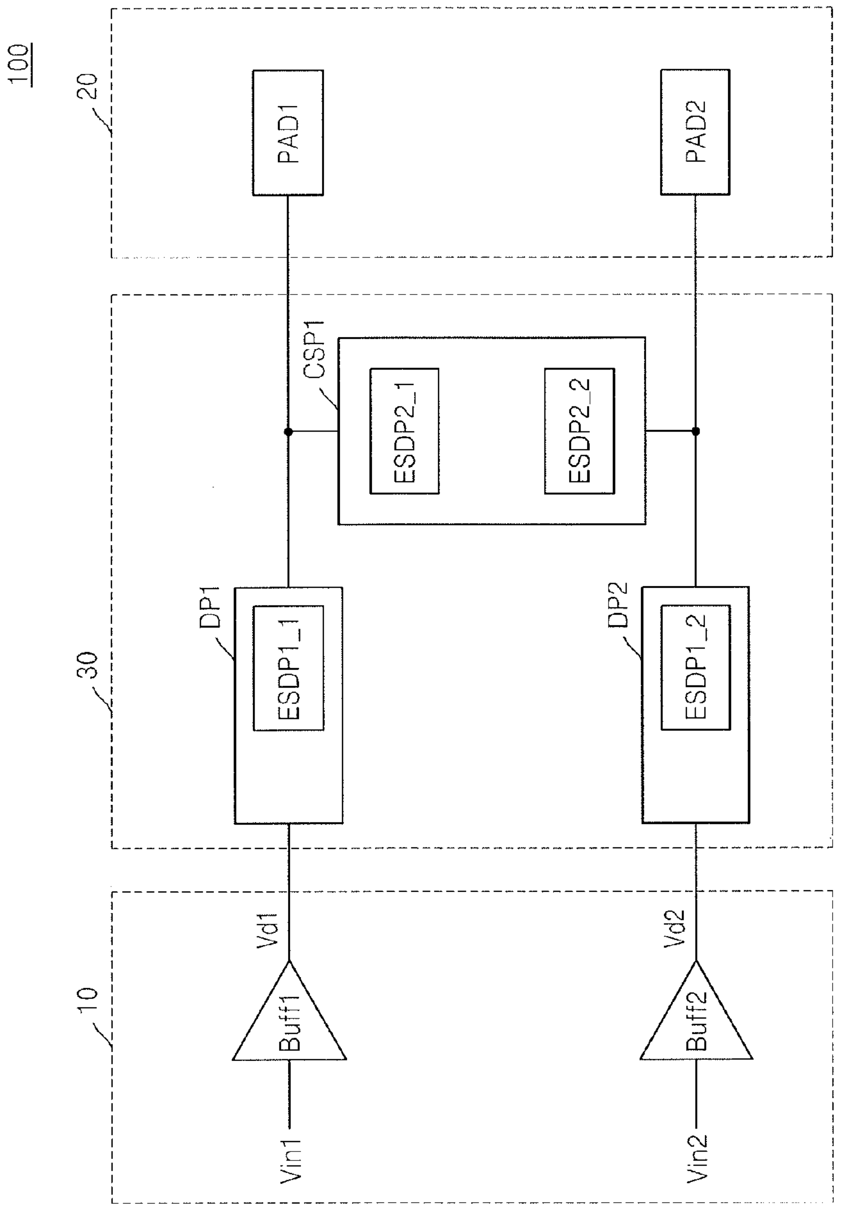
FIG. 1 illustrates a block diagram of a display driving device according to an embodiment of the inventive concept.

Example embodiments of the inventive concept will be described more fully with reference to the accompanying drawings. Like reference numerals in the drawings refer to like elements, and redundant descriptions thereof will be omitted.

The attached drawings for illustrating exemplary embodiments of the inventive concept are referred to in order to gain a sufficient understanding of the inventive concept, the merits thereof, and the objectives accomplished by the implementation of the inventive concept. The inventive concept may, however, be embodied in many different forms and should not be construed as being limited to the embodiments set forth herein; rather, these embodiments are provided so that this disclosure will be thorough and complete, and will fully convey the concept of the invention to those skilled in the art. However, this is not intended to limit the present invention to particular modes of practice, and it is to be appreciated that all changes, equivalents, and substitutes that do not depart from the spirit and technical scope of the present invention are encompassed in the present invention. In the attached drawings, dimensions of structures are enlarged or reduced for clarity of the inventive concept.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which exemplary embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 illustrates a block diagram of a display driving device 100 according to an exemplary embodiment of the inventive concept. Referring to FIG. 1, the display driving device 100 includes a driving unit 10, an output unit 20, and an output control unit 30.

The driving unit 10 includes first and second buffers Buff1 and Buff2. The first and second buffers Buff1 and Buff2 respectively generate first and second driving voltages Vd1 and Vd2, and the driving unit 10 outputs the first and second driving voltages Vd1 and Vd2. Although, in FIG. 1, the driving unit 10 includes two buffers, namely, the first and second buffers Buff1 and Buff2, this is just an example for convenience of explanation, and aspects of the inventive concept are not limited thereto. The number of buffers may depend on the number of data lines of a display panel to be driven by the display driving device 100.

The output unit 20 includes first and second output pads PAD1 and PAD2, and the first and second driving voltages Vd1 and Vd2 output from the driving unit 10 are applied to the output unit 20. The output unit 20 outputs the first and second driving voltages Vd1 and Vd2 to external, namely, data lines of display panel via the first and second output pads PAD1 and PAD2. Although, in FIG. 1, the output unit 20 includes two output pads, namely, the first and second output pads PAD1 and PAD2, this is just an example for convenience of explanation, and aspects of the inventive concept are not limited thereto. The number of output pads is the same as the number of data lines of display panel to be connected to the output pads.

The output control unit 30 includes first and second data driving paths DP1 and DP2 and a charge share path CSP1. The output control unit 30 applies the first and second driving voltages Vd1 and Vd2 from the driving unit 10 to the first and second output pads PAD1 and PAD2 of the output unit 20, respectively, via the first and second data driving paths DP1 and DP2 or electrically connects the first and second output pads PAD1 and PAD2 of the output unit 20 to each other via the charge share path CSP1.

In the display driving device 100 illustrated in FIG. 1, the first and second data driving paths DP1 and DP2 and the charge share path CSP1 of the output control unit 30 include first electrostatic discharge (ESD) protection elements ESDP1_1 and ESDP1_2 and second ESD protection elements ESDP2_1 and ESDP2_2, respectively. The first and second ESD protection elements ESDP1_1 and ESDP1_2 and ESDP2_1 and ESDP2_2 may be ESD resistors, for example. The first and second ESD protection elements ESDP1_1 and ESDP1_2 and ESDP2_1 and ESDP2_2 protect internal elements that are disposed on the first and second data driving paths DP1 and DP2 and the charge share path CSP1, respectively, from a high voltage at a predetermined level, such as static electricity that flows from outside, via the first and second output pads PAD1 and PAD2 of the output unit 10. The first and second ESD protection elements ESDP1_1 and ESDP1_2 and ESDP2_1 and ESDP2_2 are disposed on the first and second data driving paths DP1 and DP2 and the charge share path CSP1, respectively, so that a function of protecting against ESD may be improved.

Figure 2:
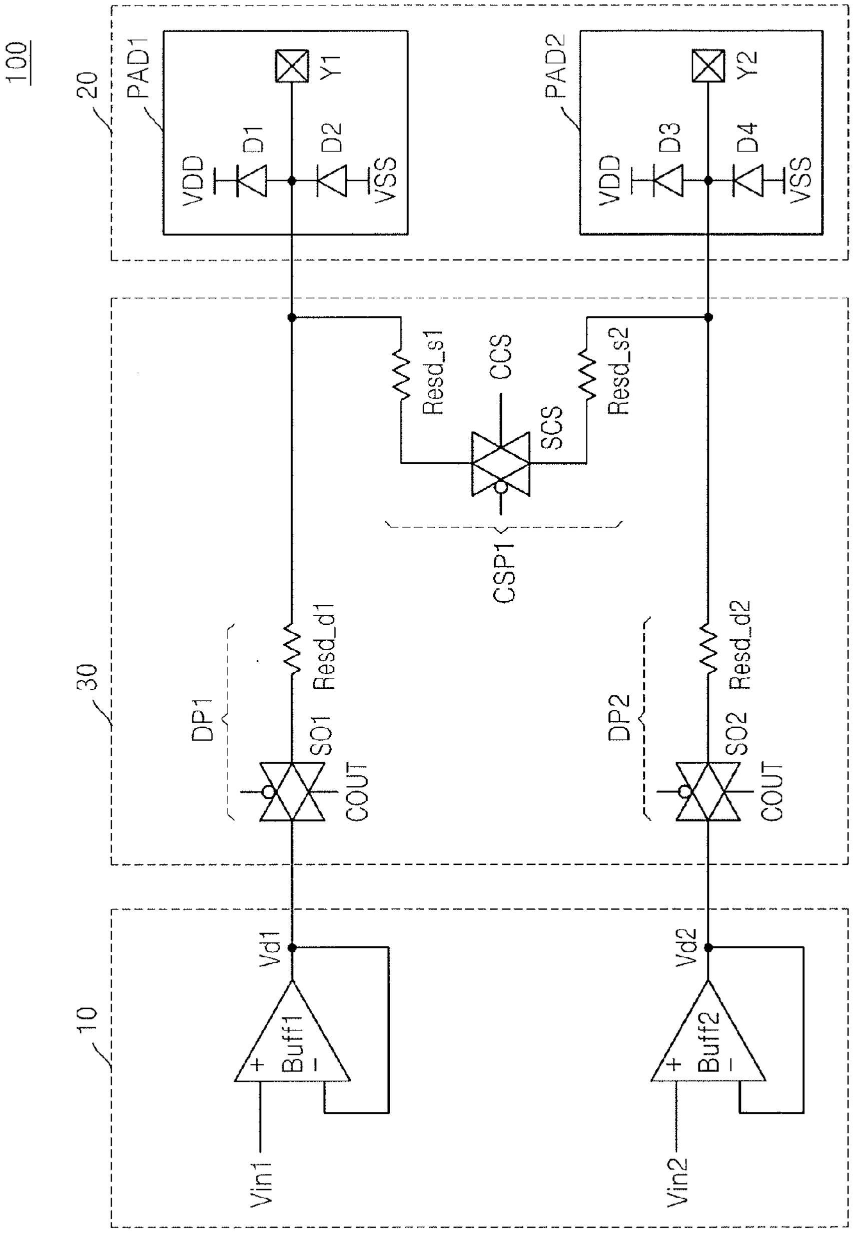
FIG. 2 illustrates a circuit diagram of the display driving device in FIG. 1 in detail.

FIG. 2 illustrates a circuit diagram of the display driving device 100 in FIG. 1 in detail. As shown in FIG. 2, the first and second buffers Buff1 and Buff2 of the driving unit 10 may include operation Amplifiers (OP AMPs) with good current driving capability.

A gray scale voltage to be applied to a first data line of a display panel may be applied to the first buffer Buff1 as an input voltage Vin1. The first buffer Buff1 buffers the input voltage Vin1 and outputs a first driving voltage Vd1. A gray scale voltage to be applied to a second data line of the display panel may be applied to the second buffer Buff2 as an input voltage Vin2. The second buffer Buff2 buffers the input voltage Vin2 and outputs a second driving voltage Vd2. The driving unit 10 outputs the first and second driving voltages Vd1 and Vd2 by buffering the gray scale voltages through the first and second buffers Buff1 and Buff2 with good current driving capability. Thus, even when load currents that flow through loads (for example, data lines of the display panel and pixel capacitors) increase, the first and second driving voltages Vd1 and Vd2 may be supplied at constant levels.

The first and second output pads PAD1 and PAD2 of the output unit 20 may include first and second output pins Y1 and Y2, and ESD protection diodes D1 and D2, and D3 and D4, which are connected between the first and second output pins Y1 and Y2 and power supply voltages VDD and VSS. The ESD protection diodes D1 and D2, and D3 and D4 are turned on when voltages at predetermined levels are applied thereto from outside via the first and second output pins Y1 and Y2, thereby forming a discharge path to the power supply voltages VDD and VSS. Thus, the ESD protection diodes D1 and D2, and D3 and D4 protect internal elements of the display driving device 100 from static electricity that flows via the first and second output pins Y1 and Y2.

As described above with reference to FIG. 1, the output control unit 30 includes first and second data driving paths DP1 and DP2 and the charge share path CSP1 and applies the first and second driving voltages Vd1 and Vd2 output from the driving unit 10 to the first and second output pads PAD1 and PAD2 of the output unit 20, respectively, according to an operating period or connects the first and second output pads PAD1 and PAD2 to each other.

In FIG. 2, the first and second ESD protection elements ESDP1_1 and ESDP1_2 and ESDP2_1 and ESDP2_2 of FIG. 1 are first ESD protection resistors Resd_d1 and Resd_d2 and second ESD protection resistors Resd_s1, and Resd_s2, respectively. However, this is just an example, and aspects of the inventive concept are not limited thereto. The first and second ESD protection elements ESDP1_1 and ESDP1_2 and ESDP2_1 and ESDP2_2 may be other protection elements for protecting internal elements of the display driving device 100 from static electricity. In addition, the first and second ESD protection elements ESDP1_1 and ESDP1_2 and ESDP2_1 and ESDP2_2 may be protection elements including the first ESD protection resistors Resd_d1 and Resd_d2 and second ESD protection resistors Resd_s1, and Resd_s2, respectively.

The first driving voltage Vd1 is applied to the first output pad PAD1, and the second driving voltage Vd2 is applied to the second output pad PAD2 in a test period or a first operating period via the first and second data driving paths DP1 and DP2, respectively. The first and second data driving paths DP1 and DP2 may include first and second output control switches SO1 and SO2, and the first ESD protection resistors Resd_d1 and Resd_d2, respectively. The first and second output control switches SO1 and SO2 may be turned on in the first operating period or the test period in response to an output control signal COUT. The first operating period may be a data driving period. The data driving period is a period in which a voltage is applied by the driving unit 10 to a pixel cell electrode of a liquid crystal capacitor in each display line of the display panel. When the first and second output control switches SO1 and SO2 are turned on in the test period or the first operating period, the first driving voltage Vd1 and the second driving voltage Vd2 are applied to the first output pad PAD1 and the second output pad PAD2 via the first and second data driving paths DP1 and DP2, respectively.

The first ESD protection resistors Resd_d1 and Resd_d2 are disposed between the first and second output pads PAD1 and PAD2 of the output unit 20 and the first and second output control switches SO1 and SO2 of the output unit 30, respectively. When a high voltage at a predetermined level, such as static electricity, is applied from the outside via first and second output pins Y1 and Y2, the first ESD protection resistors Resd_d1 and Resd_d2 protect the internal elements of the display driving device 100. Resistances of the first ESD protection resistors Resd_d1 and Resd_d2 may vary due to external needs.

A share switch SCS and the second ESD protection resistors Resd_s1 and Resd_s2 are disposed on the charge share path CSP1, and in a second operating period, for example, in the charge share period, the first output pad PAD1 and the second output pad PAD2 of the output unit 20 are electrically connected to each other via the charge share path CSP1 so that the display driving device 100 performs a charge share function. The charge share function will be described in detail below with reference to FIGS. 3A and 3B.

Although in FIG. 2 the charge share path CSP1 includes one share switch SCS and is connected only between the first output pad PAD1 and the second output pad PAD2, aspects of the inventive concept are not limited thereto. The display driving device 100 may include a plurality of output pads and a plurality of charge share paths for connecting the plurality of output pads to each other. The plurality of charge share paths may connect all the plurality of output pads in the second operating period, for example, in the charge share period.

Subsequently, referring to FIG. 2, the share switch SCS is turned on in response to the charge share signal CCS in the charge share period. The share switch SCS connects the first output pad PAD1 and the second output pad PAD2. The second ESD protection resistors Resd_s1 and Resd_s2 are connected between the first output pad PAD1 and the second output pad PAD2 and the share switch SCS, respectively. The second ESD protection resistors Resd_s1 and Resd_s2 protect the internal elements of the display driving device 100 from static electricity. Resistances of the second ESD protection resistors Resd_s1 and Resd_s2 may vary due to external needs. For example, when the display driving device 100 requires an improved function of protecting against ESD, the function of protecting against ESD may be improved by increasing resistances of the second ESD protection resistors Resd_s1 and Resd_s2.

As described above, the display driving device 100 illustrated in FIG. 2 includes ESD protection diode D1 and D2, and D3 and D4, which are disposed in the first and second output pads PAD1 and PAD2, respectively, so as to protect the internal elements of the display driving device 100 from static electricity. In addition, the first and second data driving paths DP1 and DP2 and the charge share path CSP1 that is connected to the first and second output pads PAD1 and PAD2 include the first ESD protection resistors Resd_d1 and Resd_d2 and the second ESD protection resistors Resd_s1 and Resd_s2, respectively. In this regard, resistances of the first ESD protection resistors Resd_d1 and Resd_d2 and the second ESD protection resistors Resd_s1 and Resd_s2 may be the same.

Since the charge share path CSP1 includes the second ESD protection resistors Resd_s1 and Resd_s2 that are separate from the first ESD protection resistors Resd_d1 and Resd_d2 that are in the first and second data driving paths DP1 and DP2 and directly affect output characteristics of the display driving device 100, resistances of the second ESD protection resistors Resd_s1 and Resd_s2 may be increased without affecting output characteristics of the display driving device 100 and the share switch SCS is prevented from being damaged by static electricity. For example, when ESD failure occurs in the charge share path CSP1 while an ESD test of the display driving device 100 is performed, the function of protecting against ESD may be improved by increasing resistances of the second ESD protection resistors Resd_s1 and Resd_s2 disposed on the charge share path CSP1. In contrast, since resistances of the first ESD protection resistors Resd_d1 and Resd_d2 do not vary, the output characteristics of the display driving device 100 do not vary. In addition, when there is a possibility that elements disposed on the data driving paths may be damaged due to static electricity or elements disposed on the charge share path may be damaged due to static electricity, resistances of the first ESD protection resistors Resd_d1 and Resd_d2 and the second protection resistors Resd_s1 and Resd_s22 may be adjusted.

Figure 3A:
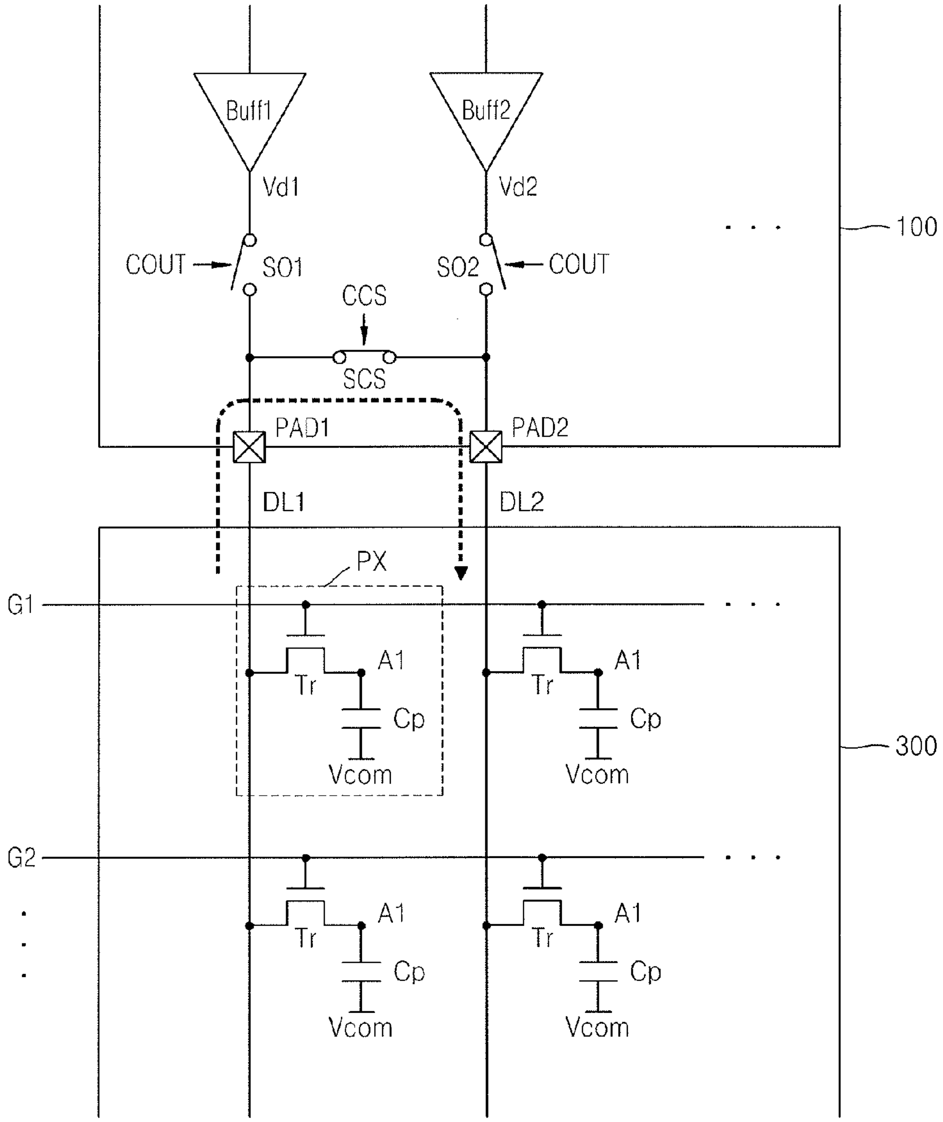
FIG. 3A illustrates an operation of the display driving device in FIG. 1 in a charge share period.
Figure 3B:
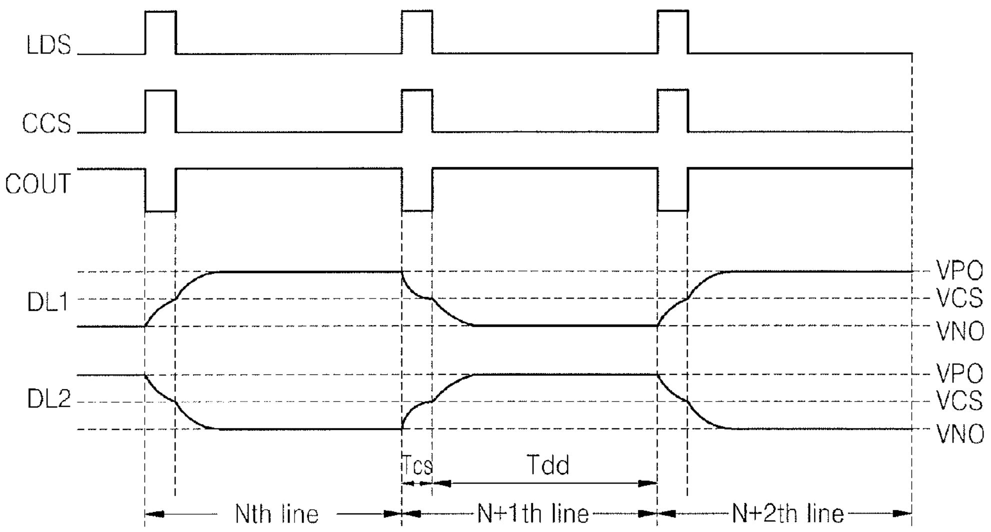
FIG. 3B illustrates waveforms of signals output from the display driving device having a charge share function and waveforms of data lines of display liquid crystals.

FIG. 3A illustrates an operation of the display driving device 100 illustrated in FIG. 1 in a charge share period. FIG. 3B illustrates waveforms of signals output from the display driving device 100 having a charge share function and waveforms of data lines of display liquid crystals.

Referring to FIG. 3A, a display panel 300 includes a plurality of pixel cells PX. Each of the plurality of pixel cells PX includes a switch transistor Tr and a liquid crystal capacitor Cp. The switch transistor Tr is turned on or off in response to a signal for driving first, second gate lines G1, G2, and . . . , and one terminal of the switch transistor Tr is connected to first, second data lines DL1, DL2, and . . . . The liquid crystal capacitor Cp is connected between the other terminal of the switch transistor Tr, i.e., a pixel cell electrode A1 and a common electrode. A common voltage Vcom is applied to the common electrode.

In order to transmit image data to each pixel cell PX of the display panel 300, the first, second gate lines G1, G2, etc. of the display panel 300 are activated sequentially in units of gate lines. First, second driving voltages Vd1, Vd2, etc. that are generated due to the image data to be transmitted to the first, second data lines DL1, DL2, etc. are applied to the pixel cell electrode A1 of the liquid crystal capacitor Cp connected to an activated gate line.

A liquid crystal is between the pixel cell electrode A1 and the common electrode. When voltages are applied to the two electrodes, an electric field is formed in the liquid crystal. An image is displayed by adjusting the amount of light that passes through the liquid crystal by adjusting the intensity of the electric field. When an electric field is continuously applied to the liquid crystal in one direction, degradation may occur in the liquid crystal. Thus, a polarity of the voltage applied to the liquid crystal capacitor Cp has to be periodically inverted so as to prevent degradation of the liquid crystal.

Thus, a voltage having a positive polarity and a voltage having a negative polarity with respect to the voltage Vcom applied to the common electrode of the liquid crystal capacitor Cp have to be alternately applied to each pixel cell electrode A1 of the display panel 300. Thus, the display panel 300 may be driven by using a frame inversion method whereby a voltage having a positive polarity and a voltage having a negative polarity are alternately applied in units of frames, a line inversion method whereby the voltage having a positive polarity and the voltage having a negative polarity are alternately applied in units of display lines, or a dot inversion method whereby voltages having different polarities are applied to adjacent pixels by using line inversion.

The display driving device 100 includes first and second buffers Buff1, Buff2, etc., first, second output pads PAD1, PAD2, etc. and . . . , and switches. The display driving device 100 drives the display panel 300. The display driving device 100 is schematically illustrated in FIG. 3A for convenience of explanation and, obviously, may further include other elements.

Output control switches SO1 and SO2 are connected between output terminals of the first, second buffers Buff1, Buff2, etc., and the first, second output pads PAD1, PAD2, etc., and share switches. The first and second output control switches SO1 and SO2 operate in response to an output control signal COUT. The share switch SCS is connected between the first output pad PAD1 and the second output pad PAD2. The share switch SCS operates in response to the charge share signal CCS.

Hereinafter, the charge share function will be described with reference to FIGS. 3A and 3B. In this regard, it is assumed that data to be displayed in each display line and each pixel cell PX are the same and the display driving device 100 drives the display panel 300 by a dot inversion method.

On the first output pad PAD1 illustrated in FIG. 3A, when an N-th line of the display panel 300 is displayed, i.e., in a period where an N-th gate line Gn is activated, a positive driving voltage VPO is applied to the first data line DL1, and when an (N+1)-th line of the display panel 300 is displayed, i.e., in a period where an (N+1)-th gate line Gn+1 is activated, a negative driving voltage VNO is applied to the first data line DL1. On the second output pad PAD2 illustrated in FIG. 3A, when the N-th gate line Gn of the display panel 300 is displayed, the negative driving voltage VNO is applied to the second data line DL2, and when the (N+1)-th gate line Gn+1 of the display panel 300 is displayed, the positive driving voltage VPO is applied to the second data line DL2. The first driving voltage Vd1 and the second driving voltage Vd2 having different polarities are applied to the first and second data lines DL1 and DL2 via two adjacent output pads, namely, the first and second output pads PAD1 and PAD2. The first and second driving voltages Vd1 and Vd2 are generated and output by the first and second buffers Buff1 and Buff2.

In FIG. 3B, when a line display start (LDS) signal is toggled and lines are sequentially displayed, a control charge share (CCS) signal may be at a first level, for example, a high level, in a predetermined period and is used to turn on the share switch SCS. The predetermined period is referred to as a second operating period, for example, a charge share period. The output control signal COUT is at a second level in the charge share period, for example, a low level, and is used to turn off first and second output control switches SO1 and SO2. Since the first and second output control switches SO1 and SO2 are turned off, the first and second driving voltages Vd1 and Vd2 that are generated and output by the first and second buffers Buff1 and Buff2 are not applied to the first and second output pads PAD1 and PAD2. Instead, the share switch SCS connects the first output pad PAD1 and the second output pad PAD2, a charge is shared between the first data line DL1 and the second data line DL2 so that the first data line DL1 and the second data line DL2 are increased or decreased to the charge share voltage VCS without driving the first and second buffers Buff1 and Buff2.

The dashed line arrow of FIG. 3A represents that a charge is shared between the first data line DL1 and the second data line DL2 when the first data line DL1 and the second data line DL2 are electrically connected to each other in a charge share period Tcs of FIG. 3B. When the N-th gate line Gn is displayed, the first data line DL1 is driven with a positive driving voltage VPO, and the second data line DL2 is driven with a negative driving voltage VNO. When the LDS signal is toggled and the next line, i.e., the (N+1)-th gate line Gn+1 is displayed, a charge share function is performed in the charge share period Tcs for a predetermined amount of time. The first and second data lines DL1 and DL2 are electrically connected so that a current flows from the first data line DL1 having a high voltage to the second data line DL2 having a low voltage. Thus, the first data line DL1 is decreased to the charge share voltage VCS, and the second data line DL2 is increased to the charge share voltage VCS.

Although, in FIG. 3B, the first data line DL1 and the second data line DL2 are ideally at the same voltage level, the first and second data lines DL1 and DL2 may not be at the same voltage level due to a length of the charge share period Tcs and a turn-on resistance of the charge share path CSP1. In a data driving period Tdd after the charge share period Tcs, the charge share signal CCS is at the second level, for example, at the low level, and the share switch SCS is turned off, and the first and second output control switches SO1 and SO2 are turned on. Thus, the first and second driving voltages Vd1 and Vd2 that are generated and output by the first and second buffers Buff1 and Buff2 are applied to the first and second data lines DL1 and DL2, respectively. That is, the first data line DL1 is driven with a negative driving voltage VNO, and the second data line DL2 is driven with a positive driving voltage VPO.

As described above, the charge share function involves sharing a charge between data lines by connecting the data lines of the display panel temporarily when gate lines to be driven, i.e., lines to be displayed, vary. Thus, driving burden of the buffers may be reduced.

In FIG. 2, the display driving device 100 includes the second ESD protection resistors Resd_s1 and Resd_s2 disposed on the charge share path CSP1 separate from the first ESD protection resistors Resd_d1 and Resd_d2 disposed on the first and second data driving paths DP1 and DP2, respectively. The function of protecting against ESD is improved by increasing the resistances of the second ESD protection resistors Resd_s1 and Resd_s2. As described above, the charge share function serves as an auxiliary function of reducing a driving burden of the buffers and does not directly affect the output characteristics of a display driving device 100. Thus, in accordance with embodiments, the display driving device 100 may maintain its output characteristics while improving protection against ESD.

Figure 4:
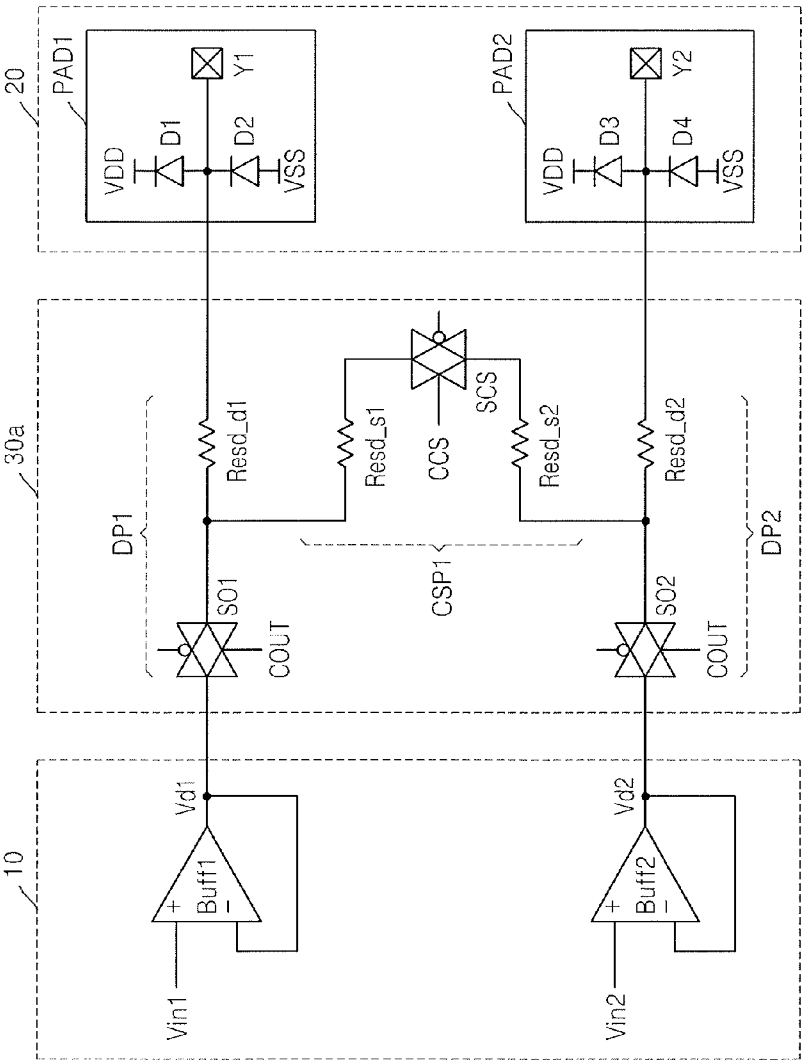
FIGS. 4 through 7 illustrate circuit diagrams of display driving devices according to other embodiments of the inventive concept.

FIG. 4 is a circuit diagram of a display driving device 100*a* according to another embodiment of the inventive concept. The display driving device 100*a* illustrated in FIG. 4 includes substantially the same elements as those of the display driving device 100 illustrated in FIG. 2. Therefore, only differences between the output control unit 30 of FIG. 2 and an output control unit 30*a* of FIG. 4 will be described in detail below.

In particular, in the display device 100 of FIG. 2, the second ESD protection resistors Resd_s1 and Resd_s2 of the charge share path CSP1 are connected between the first and second output pads PAD1 and PAD2 of the output unit 20 and the share switch SCS of the output control unit 30. In contrast, in the display device 100*a* of FIG. 4, second ESD protection resistors Resd_s1 and Resd_s2 of the charge share path CSP1 are connected between first ESD protection resistors Resd_d1 and Resd_d2 of first and second data driving paths DP1 and DP2, respectively, and the share switch SCS of the output control unit 30*a*. Thus, in the display device 100*a* of FIG. 4, the share switch SCS of the charge share path CSP1 may be protected from static electricity by the first ESD protection resistors Resd_d1 and Resd_d2 of the first and second data driving paths DP1 and DP2, respectively, as well as by the second ESD protection resistors Resd_s1 and Resd_s2 of the charge share path CSP1.

Figure 5:
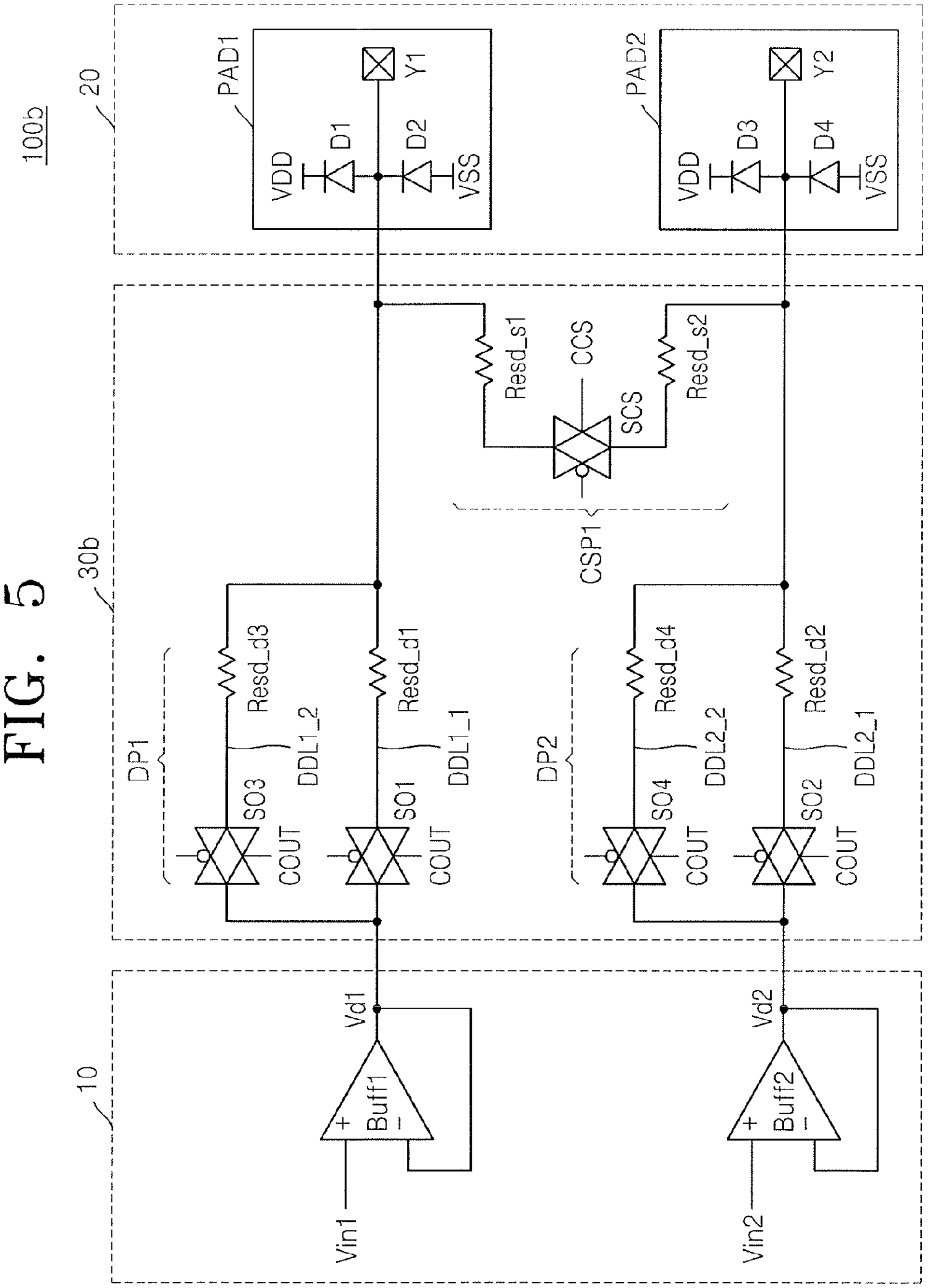

FIG. 5 is a circuit diagram of a display driving device 100*b* according to another embodiment of the inventive concept. The display driving device 100*b* illustrated in FIG. 5 includes substantially the same elements as those of the display driving device 100 illustrated in FIG. 2. Therefore, only differences between the output control unit 30 of FIG. 2 and an output control unit 30*b* of FIG. 5 will be described in detail below.

In particular, in the display driving device 100*b* illustrated in FIG. 5, the first data driving path DP1 of the output control unit 30*b* includes two data driving lines DDL1_1 and DDL1_2 in which first output control switches SO1 and SO3 and first ESD protection resistors Resd_d1 and Resd_d3 are connected in series, respectively. The two data driving lines DDL1_1 and DDL1_2 are connected in parallel between the first buffer Buff1 and the first output pad PAD1. Thus, a resistance between the first buffer Buff1 and the first output pad PAD1 is reduced, and output characteristics of the display driving device 100*b* through the first output pad PAD1 are improved. In addition, since the first ESD protection resistors Resd_d1 and Resd_d3 are connected between the first output pad PAD1 and the first output control switches SO1 and SO3, respectively, a function of protecting against ESD of the display driving device 100*b* of FIG. 5 is the same as that of the display driving device 100 of FIG. 2. As a configuration of the second data driving path DP2 is the same as a configuration of the first data driving path DP1, a resistance between the second buffer Buff2 and the second output pad PAD2 is similarly reduced, and output characteristics of the display driving device 100*b* through the second output pad PAD2 are improved.

Figure 6:
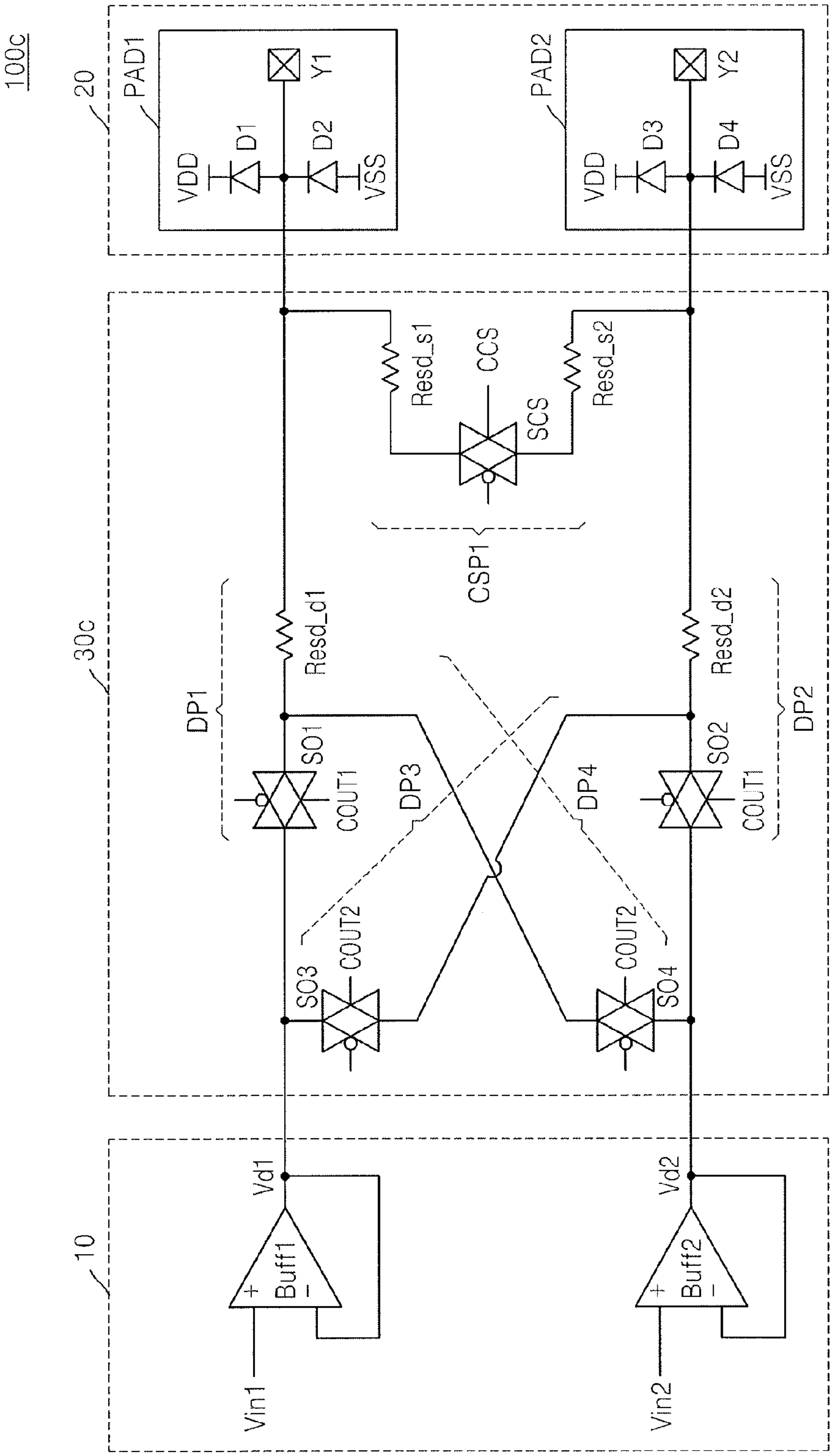

FIG. 6 is a circuit diagram of a display driving device 100*c* according to another embodiment of the inventive concept. The display driving device 100*c* illustrated in FIG. 6 includes substantially the same elements as those of the display driving device 100 illustrated in FIG. 2. Therefore, only differences between the output control unit 30 of FIG. 2 and an output control unit 30*c* of FIG. 6 will be described in detail below.

In the display driving device 100*c* illustrated in FIG. 6, each of first and second buffers Buff1 and Buff2 of the driving unit 10 may generate and output a voltage having a positive polarity or a voltage having a negative polarity with respect to a common voltage Vcom (see FIG. 3) that is applied to a common electrode. For example, when a first driving voltage Vd1 is a voltage having a positive polarity with respect to the voltage Vcom, a second driving voltage Vd2 is a voltage having a negative polarity with respect to the voltage Vcom.

In order to drive the display panel (300 of FIG. 3A) by a dot inversion method, the output control unit 30*c* includes a first data driving path DP1 via which the first driving voltage Vd1 is applied to the first output pad PAD1, a second data driving path DP2 via which the second driving voltage Vd2 is applied to the second output pad PAD2, a third data driving path DP3 via which the first driving voltage Vd1 is applied to the second output pad PAD2, and a fourth data driving path DP4 via which the second driving voltage Vd2 is applied to the first output pad PAD1. First and second output control switches SO1 and SO2 of the first and second data driving paths DP1 and DP2, respectively, operate in response to a first output control signal COUT1. Third and fourth output control switches SO3 and SO4 of the third data driving path DP3 and the fourth data driving path DP4, respectively, operate in response to a second output control signal COUT2.

The first output control signal COUT1 and the second output control signal COUT2 are alternately applied in units of display lines and are at a switch turn-on level, i.e., a high level, in a data driving period. That is, when the first output control signal COUT1 is at a high level in the data driving period when an N-th gate line is displayed, the second output control signal COUT2 is at a low level, and in a data driving period when an (N+1)-th gate line is displayed, the second output control signal COUT2 is at a high level, and the first output control signal COUT1 is at a low level. Thus, a positive driving voltage and a negative driving voltage may be alternately output in units of lines through the first and second output pads PAD1 and PAD2.

In this regard, the third data driving path DP3 shares the first ESD protection resistor Resd_d1 with the first data driving path DP1. Thus, the first ESD protection resistor Resd_d1 of the first data driving path DP1 protects the first and third output control switches SO1 and SO3 of the first data driving path DP1 and the third data driving path DP3 when static electricity flows through the first output pad PAD1.

The fourth data driving path DP4 shares the first ESD protection resistor Resd_d2 with the second data driving path DP2. Thus, the first ESD protection resistor Resd_d2 of the second data driving path DP2 protects the second and fourth output control switches SO2 and SO4 of the second data driving path DP2 and the fourth data driving path DP4 when static electricity flows through the second output pad PAD2.

In the display driving device 100*c* of FIG. 6, two data driving paths are connected to the first and second output pads PAD1 and PAD2, respectively. However, internal elements on the two data driving paths connected to each of the outputs PAD1 and PAD2 may be protected from static electricity by using one first ESD protection resistor.

Figure 7:
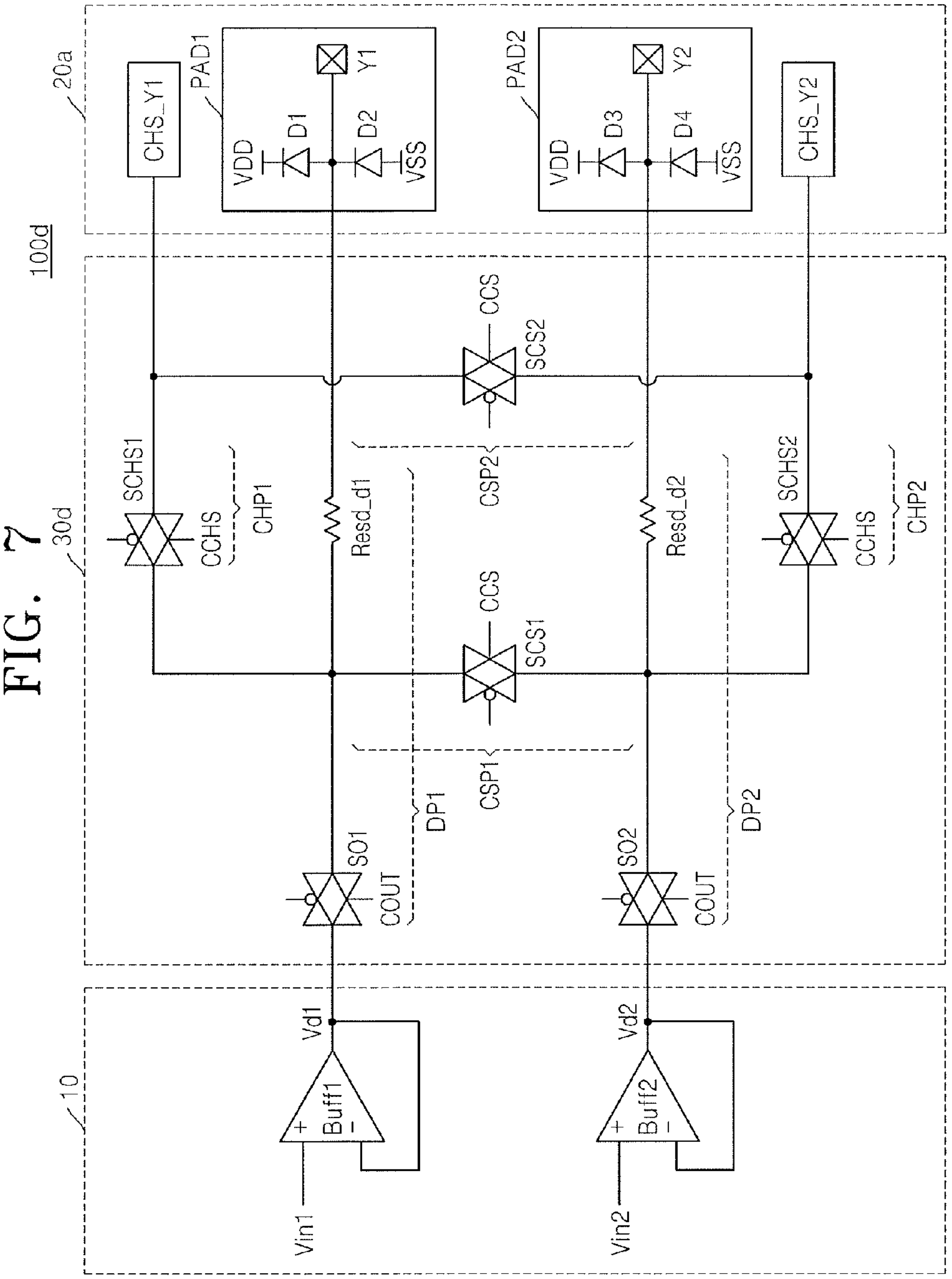

FIG. 7 is a circuit diagram of a display driving device 100*d* according to another embodiment of the inventive concept. Referring to FIG. 7, the display driving device 100*d* includes the driving unit 10, an output unit 20*a*, and an output control unit 30*d*.

The driving unit 10 generates first and second driving voltages Vd1 and Vd2. A structure and operation of the driving unit 10 is substantially the same as that of the display driving device 100 of FIG. 2 and, thus, a detailed description thereof is not repeated.

The output unit 20*a* includes first and second output pads PAD1 and PAD2 and first and second test pads CHS_Y1 and CHS_Y2. The first and second output pads PAD1 and PAD2 are connected to external data lines, i.e., data lines of a display panel. First and second driving voltages Vd1 and Vd2 that are generated by the driving unit 10 are output through the first and second output pads PAD1 and PAD2. The first and second test pads CHS_Y1 and CHS_Y2 are used to test whether first and second buffers Buff1 and Buff2 of the driving unit 10 generate target voltage values or not. Although, in FIG. 7, there are two output pads, namely, the first and second output pads PAD1 and PAD2, and two test pads, namely, the first and second test pads CHS_Y1 and CHS_Y2, this is just an example, and aspects of the inventive concept are not limited thereto. The number of output pads may vary according to data lines of a display panel, and the number of test pads may vary in consideration of time in a test period or a chip area of the display driving device 100*d*. In addition, predetermined output pads may be set as test pads.

The output control unit 30*d* includes first and second data driving paths DP1 and DP2, a first charge share path CSP1, a second charge share path CSP2, and first and second channel shift paths CHP1 and CHP2. Each of the first and second data driving paths DP1 and DP2, the first and second charge share paths CSP1 and CSP2, and the first and second channel shift paths CHP1 and CHP2 includes at least one switch. The output control unit 30*d* may apply the first and second driving voltages Vd1 and Vd2 that are output by the driving unit 10 to the first and second output pads PAD1 and PAD2 or first and second test pads CHS_Y1 and CHS_Y2 in response to signals for controlling switches included in the paths described above, or may connect the first and second output pads PAD1 and PAD2 electrically to each other so that a charge may be shared between data lines of a display panel connected to the first and second output pads PAD1 and PAD2.

The first and second data driving paths DP1 and DP2 include first and second output control switches SO1 and SO2 and first ESD protection resistors Resd_d1 and Resd_d2, respectively. The first and second data driving paths DP1 and DP2 respectively apply the first driving voltage Vd1 to the first output pad PAD1 and the second driving voltage Vd2 to the second output pad PAD2 in a first operating period, for example, in a data driving period.

The first charge share path CSP1 includes a first share switch SCS1 and connects the first output pad PAD1 and the second output pad PAD2 of the output unit 20 electrically in a second operating period, for example, in a charge share period so that a charge may be shared between data lines of a display panel connected to the first output pad PAD1 and the second output pad PAD2. Although FIG. 7 illustrates one first charge share path CSP1, this is just an example for convenience of explanation, and aspects of the inventive concept are not limited thereto. The display driving device 100*d* may include a plurality of output pads and a plurality of charge share paths that connect the plurality of output pads. The plurality of first charge share paths may electrically connect all the plurality of output pads in the second operating period, for example, in the charge share period.

The second charge share path CSP2 includes a second share switch SCS2. The second share switch SCS2 is connected between a first channel shift path CHP1 and a second channel shift path CHP2 and is turned on or off in response to a charge share signal CCS. Thus, the charge share function is performed by connecting the first channel shift path CHP1 and the second channel shift path CHP2 in the charge share period.

The first and second channel shift paths CHP1 and CHP2 include first and second channel shift switches SCHS1 and SCHS2, respectively. The first and second channel shift switches SCHS1 and SCHS2 are turned on or off in response to a channel shift signal CCHS and are turned on in the test period or the charge share period. When the first and second channel shift switches SCHS1 and SCHS2 are turned on in the test period, the first and second driving voltages Vd1 and Vd2 that are generated by the first and second buffers Buff1 and Buff2 are applied to the first and second test pads CHS_Y1 and CHS_Y2, respectively. This is referred to as a channel shift function and will be described now in detail with reference to FIG. 8.

Figure 8:
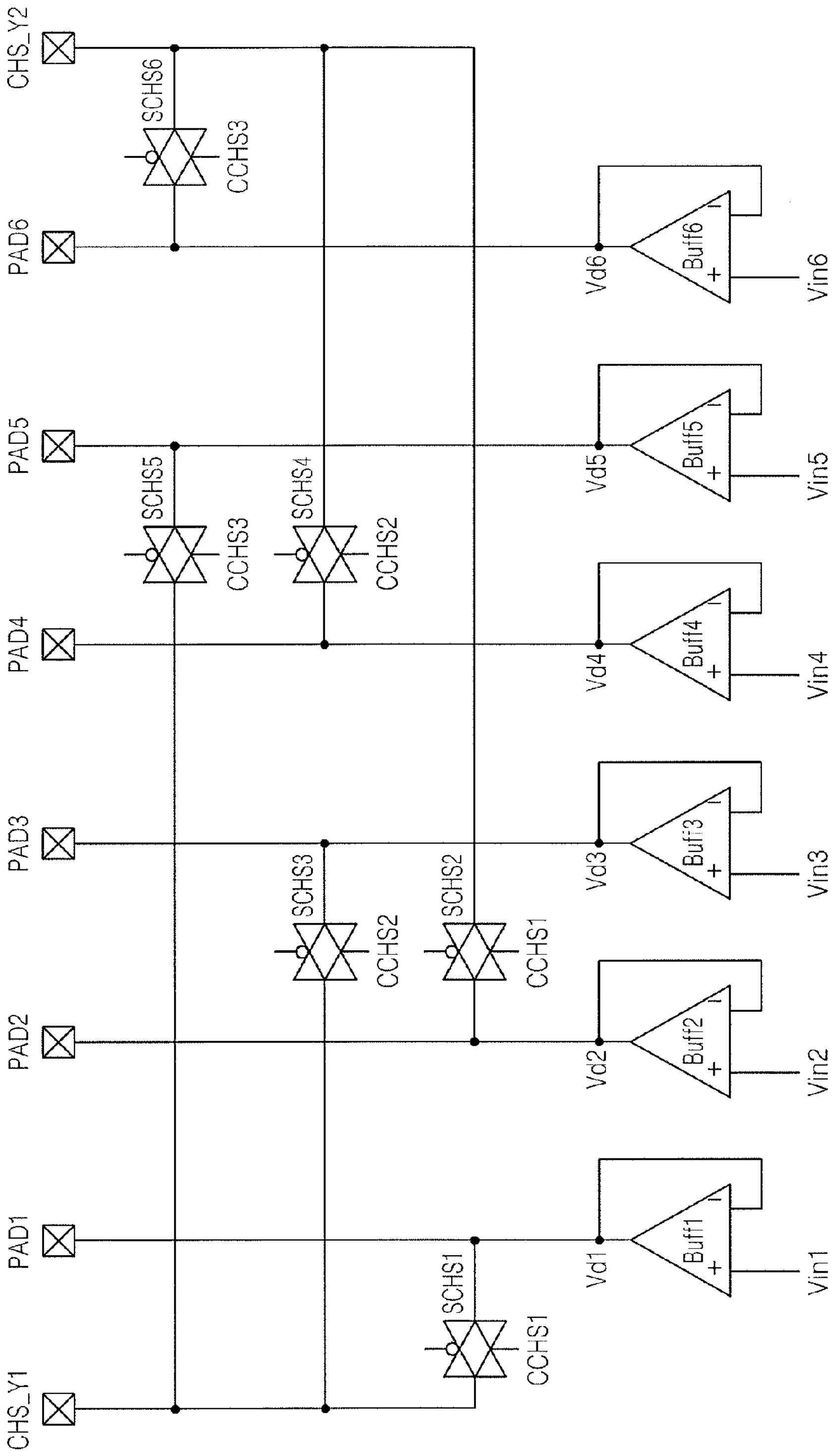
FIG. 8 illustrates a channel shift function of a display driving device in a test period.

FIG. 8 illustrates a channel shift function of a display driving device in a test period.

Referring to FIG. 8, the display driving device includes six buffers, namely, first to sixth buffers Buff1 to Buff6, six output pads, namely, first to sixth output pads PAD1 to PAD6, two test pads, namely, first and second test pads CHS_Y1 and CHS_Y2, and six channel shift switches, namely, first to sixth channel shift switches SCHS1 to SCHS6, that apply first to sixth driving voltages Vd1 to Vd6 generated by the first to sixth buffers Buff1 to Buff6, respectively, to the first and second test pads CHS_Y1 and CHS_Y2. For convenience of explanation, the display driving device includes six buffers, six buffers, six output pads, and channel shift switches, but aspects of the inventive concept are not limited thereto.

Whether each of the first to sixth buffers Buff1 to Buff6 generates a driving voltage at a desired level before the display driving device is connected to a display liquid crystal of a display panel is tested. In this regard, the test may be performed by measuring voltages output from the first to sixth output pads PAD1 to PAD6 one-by-one but this takes a long time. However, by sequentially applying the first and second driving voltages Vd1 and Vd2 to two test pads, namely, the first and second test pads CHS_Y1 and CHS_Y2 using the channel shift function, and by measuring only voltages output from the two test pads, namely, the first and second test pads CHS_Y1 and CHS_Y2, whether each of the first to sixth buffers Buff1 to Buff6 generates a driving voltage at a target level may be quickly tested.

In FIG. 8, the first and second channel shift switches SCHS1 and SCHS2 operate in response to the first channel control signal CCHS1, and the third and fourth channel shift switches SCHS3 and SCHS4 operate in response to the second channel control signal CCHS2, and the fifth and sixth channel shift switches SCHS5 and SCHS6 operate in response to the third channel control signal CCHS3. In the test period, the first to third channel control signals CCHS1 to CCHS3 are at sequentially turned-on levels. Thus, the first driving voltage Vd1, the third driving voltage Vd3, and the fifth driving voltage Vd5 are sequentially applied to the first test pad CHS_Y1, and the second driving voltage Vd2, the fourth driving voltage Vd4, and the sixth driving voltage Vd6 are sequentially applied to the second test pad CHS_Y2. Thus, it may be determined whether the first to sixth buffers Buff1 to Buff6 generate and output voltages at target levels by measuring voltages output from the first test pad CHS_Y1 and the second test pad CHS_Y2 and by classifying the measured voltages based on a temporal order. In this regard, a channel shift function involves applying of the first to sixth driving voltages Vd1 to Vd6 generated by the first to sixth buffers Buff1 to Buff6 to the first and second test pads CHS_Y1 and CHS_Y2 via the first to sixth channel shift switches SCHS1 to SCHS6.

Referring back to FIG. 7, in the display driving device 100*d* of FIG. 7, in the test period, the first and second channel shift switches SCHS1 and SCHS2 and the first and second output control switches SO1 and SO2 are turned on, and the first driving voltage Vd1 is applied to the first test pad CHS_Y1, and the second driving voltage Vd2 is applied to the second test pad CHS_Y2. Thus, it may be tested whether the first and second buffers Buff1 and Buff2 generate the first and second driving voltages Vd1 and Vd2 at target levels via the first and second channel shift paths CHP1 and CHP2.

In the second operating period, for example, in the charge share period, the first and second channel shift switches SCHS1 and SCHS2, the first share switch SCS1, and the second share switch SCS2 are turned on, and the first and second output control switches SO1 and SO2 are turned off. Since the charge share operation is performed via the second charge share path CSP2 connected to the first and second channel shift paths CHP1 and CHP2 as well as the first charge share path CSP1, the charge share function is improved.

Figure 9:
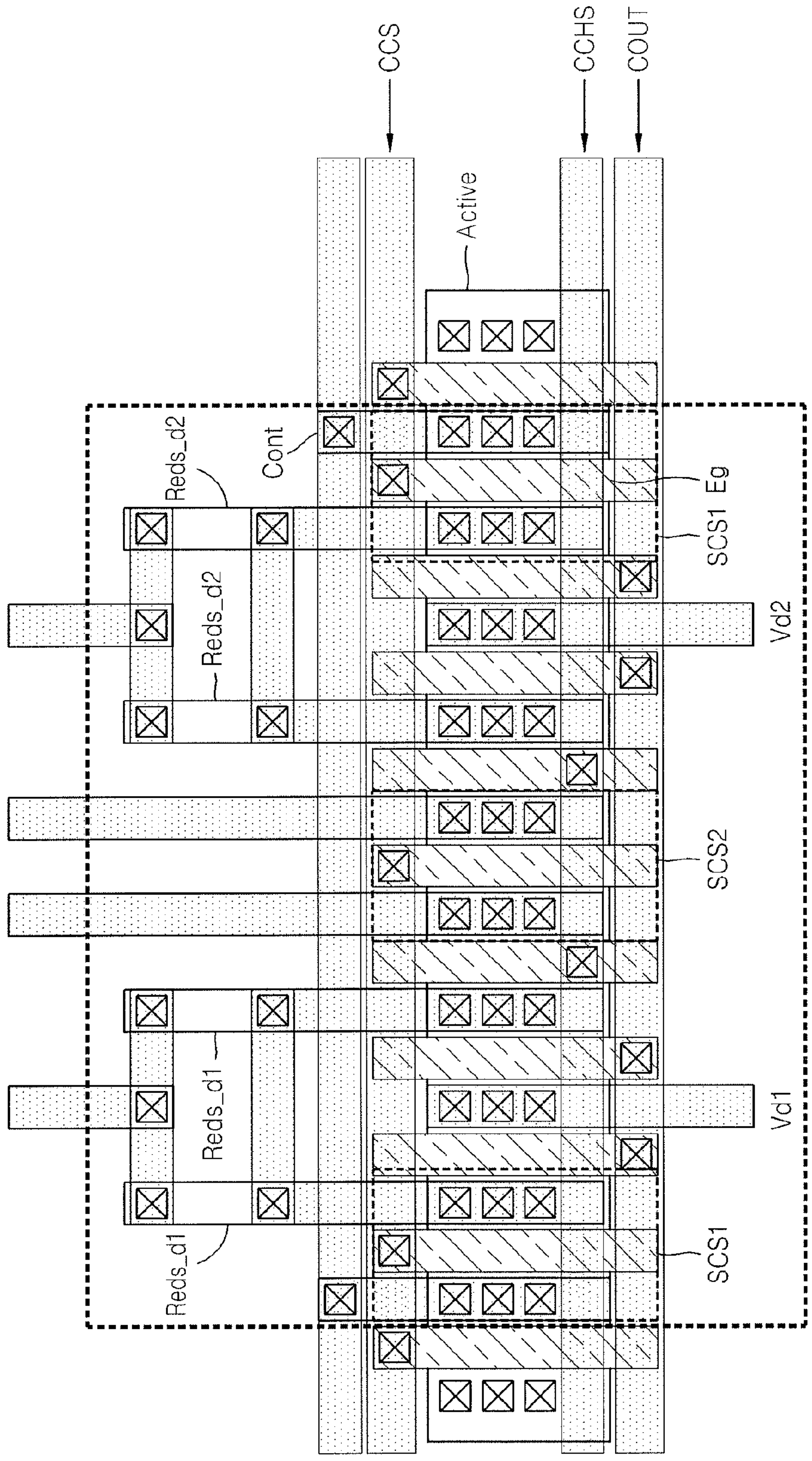
FIG. 9 illustrates a layout of an output control unit of the display driving device in FIG. 7.

FIG. 9 illustrates a layout of the output control unit 30*d* of the display driving device 100*d* illustrated in FIG. 7. The display driving device 100*d* is laid out on a semiconductor substrate. Switches SO1, SO2, SCHS1, SCHS2, SCS1, and SCS2 are illustrated as metal-oxide semiconductor field effect transistors (MOSFETs). Control signals COUT, CCS, and CCHS are applied from the outside via metal lines to the MOSFETs correspond to the switches SO1, SO2, SCHS1, SCHS2, SCS1, and SCS2. Metal lines are connected to gate electrodes Eg of the MOSFETs via contact portions Cont.

Figure 10A:
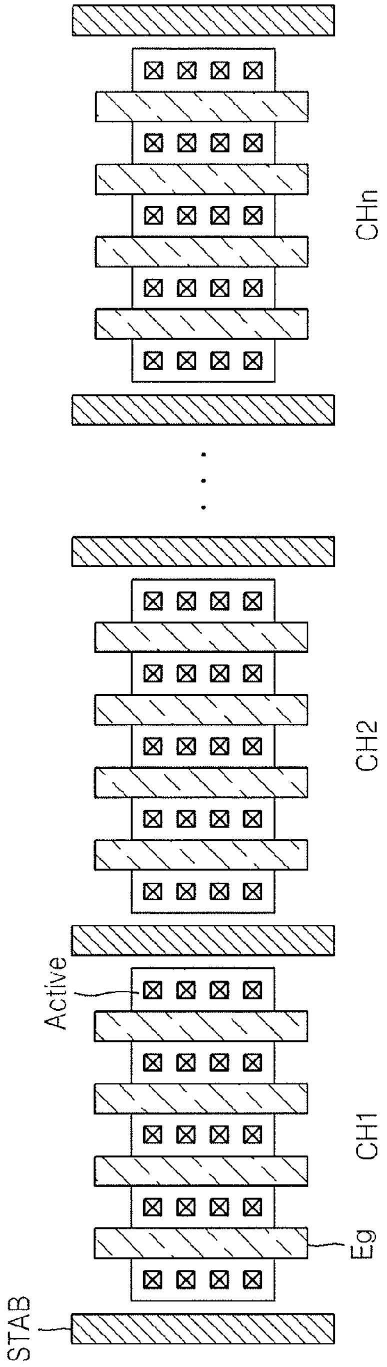
FIGS. 10A through 10C illustrate layout methods.
Figure 10B:
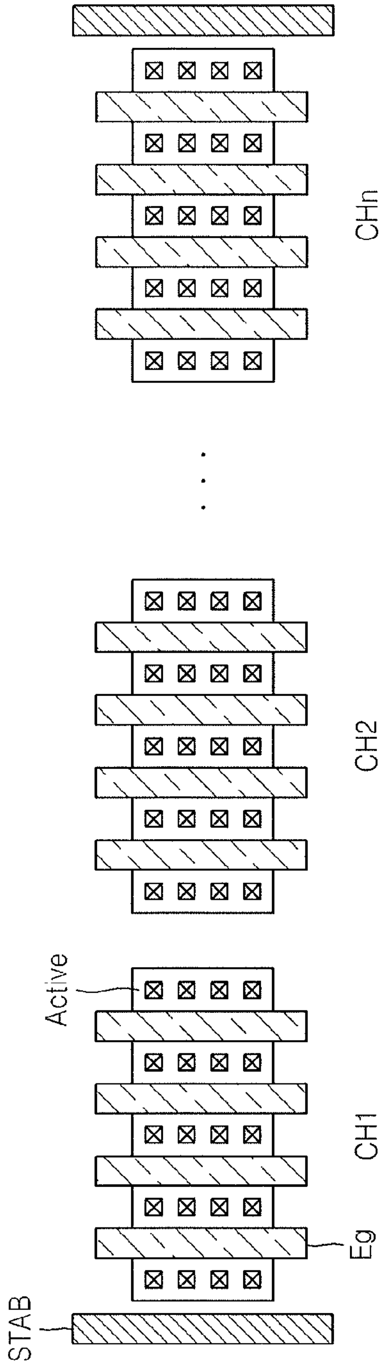

Layout methods will be briefly described with reference to FIGS. 10A through 10C. Referring to FIG. 10A, a plurality of transistors are formed in each of active regions Active, and a substrate tab STAB is formed between the active regions Active. Each of the plurality of transistors includes gate electrodes Eg, shares a source or drain between the transistors, and is formed in the same active region Active. In this regard, the active region Active is a region in which a transistor is formed, and the substrate tab STAB is a voltage connection terminal that applies a predetermined voltage to a semiconductor substrate. A buffer and circuits relating to output of the buffer in the display driving device, for example, the first buffer Buff1, the first output switch SO1, the first channel shift switch SCHS1, the first ESD protection resistor Reds_d1, and the first output pad PAD1 illustrated in FIG. 7, are referred to as one channel. Ends of switches included in each channel are connected to each other and share a source or drain on the layout. Thus, switches included in one channel may be formed in the same active region, as illustrated in FIG. 10A. In this regard, in order to prevent a current flow between the active regions Active or a current flow between the active region Active and the semiconductor substrate, the substrate tab STAB that applies a predetermined voltage to the semiconductor substrate has to be formed between the active regions Active. Alternatively, a predetermined distance between the active regions Active has to be maintained, as illustrated in FIG. 10B.

Figure 10C:
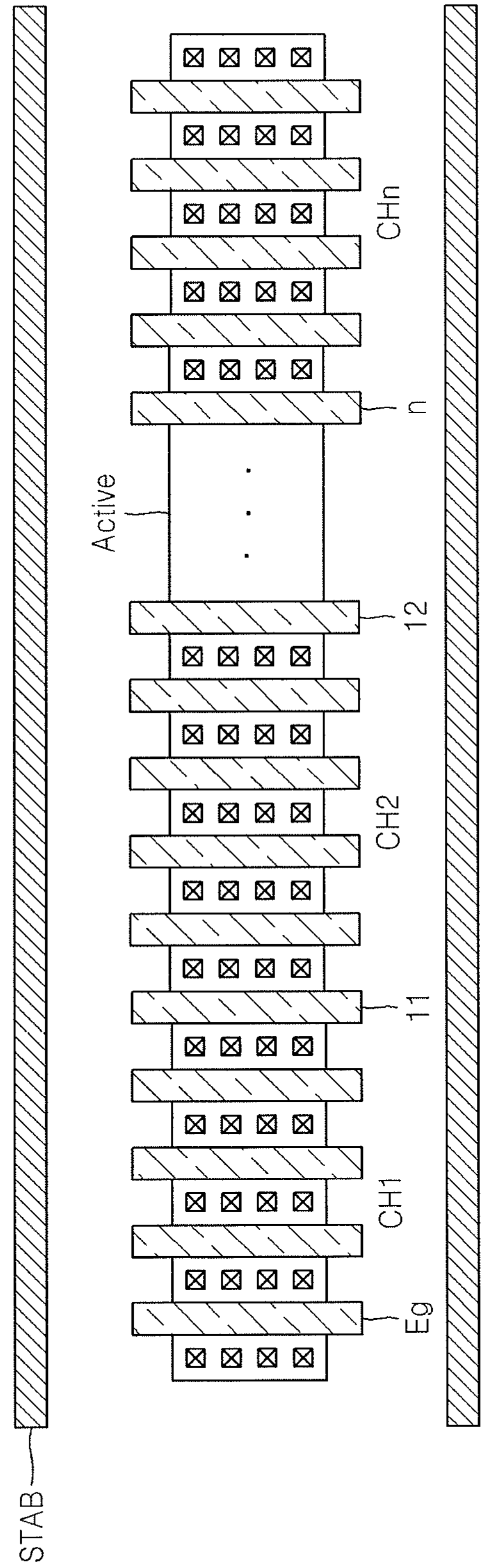

However, when the display driving device includes a switch that connects channels, all switches may be formed in the same active region Active, as illustrated in FIG. 10C. The switch that connects channels may be formed by adding gate electrodes 11, 12, . . . , and n between the active regions of each channel. Thus, since all switches are formed in the same active region Active, the active regions Active do not need to be separated from each other. Widths of the added gate electrodes 11, 12, . . . , and n are smaller than a distance between the active regions Active illustrated in FIGS. 10A and 10C. Thus, a layout area of the display driving device may be reduced.

Referring back to FIG. 9, ends of the switches included in a channel which include a buffer and circuits relating to output of the buffer of the display driving device 100*d* illustrated in FIG. 7 are connected to each other, and thus, the switches are formed in the same active region in FIG. 9. The first share switch SCS1 and the second share switch SCS2 that connect channels are formed between the channels. As a result, all switches are formed in the same active region while the active regions Active of each channel are not separated from each other, as described above with reference to FIG. 10C. Thus, the layout area of the display driving device 100*d* may be reduced compared to a case where the display driving device 100*d* does not include the share switches SCS1 and SCS2.

Figure 11:
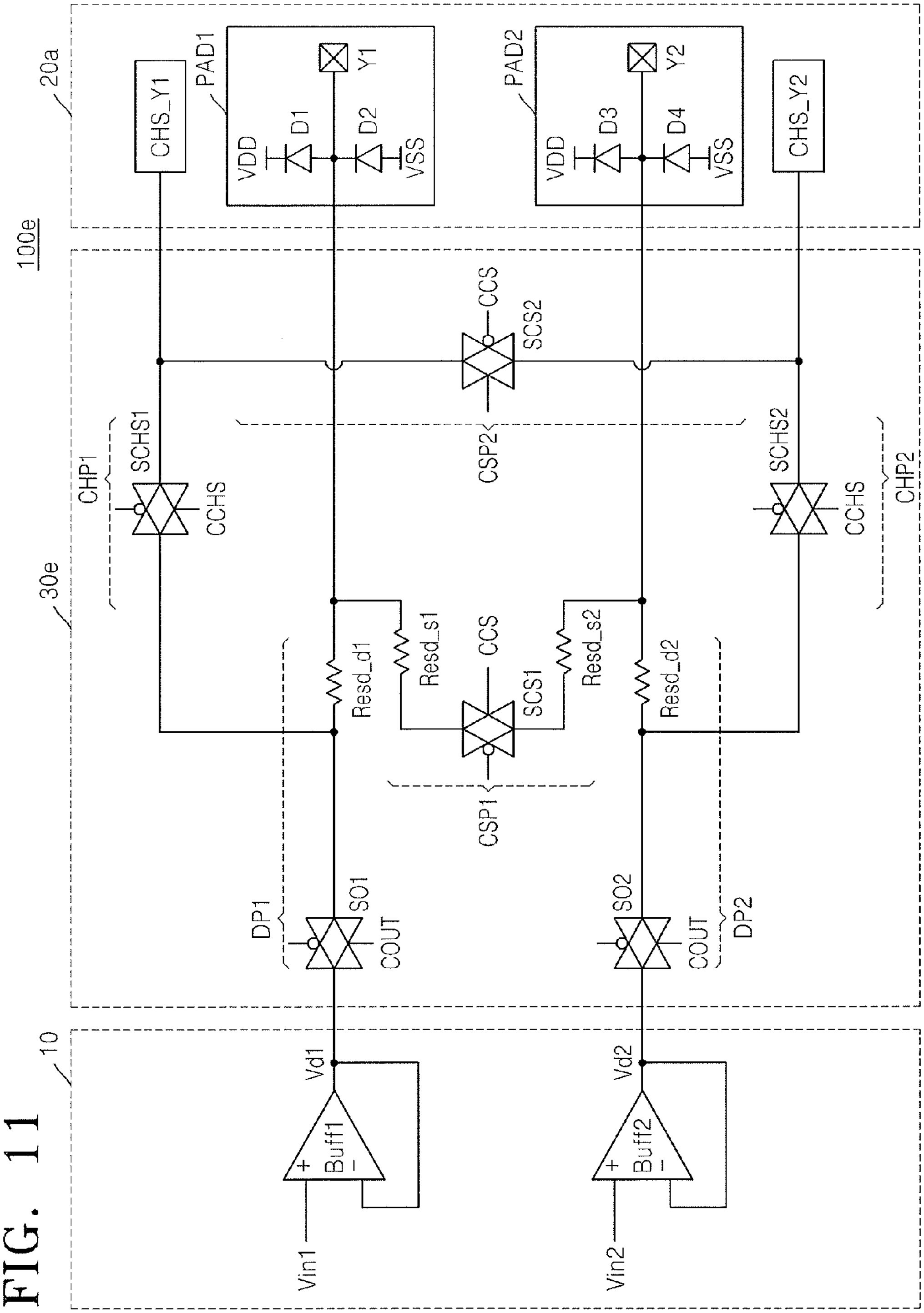
FIG. 11 illustrates a circuit diagram of a display driving device according to another embodiment of the inventive concept.

FIG. 11 is a circuit diagram of a display driving device 100*e* according to another embodiment of the inventive concept. The display driving device 100*e* illustrated in FIG. 11 includes substantially the same elements as those of the display driving device 100*d* illustrated in FIG. 7. Therefore, only differences between the output control unit 30*d* of FIG. 7 and an output control unit 30*e* of FIG. 11 will be described in detail below.

Comparing the display driving device 100*e* of FIG. 11 with the display driving device 100*d* of FIG. 7, first and second data driving paths DP1 and DP2 and a first charge share path CSP1 include first ESD protection resistors Resd_d1 and Resd_d2 and second ESD protection resistors Resd_s1 and Resd_s2, respectively. Since the first charge share path CSP1 includes the second ESD protection resistors Resd_S1 and Resd_S2 that are disposed separate from the first ESD protection resistors Resd_D1 and Resd_D2 that are connected to the first and second data driving paths DP1 and DP2 and directly affect output characteristics of the display driving device 100*e*, only resistances of the second ESD protection resistors Resd_S1 and Resd_S2 are increased so that the output characteristics of the display driving device 100*e* are not affected by the first ESD protection resistors Resd_D1 and Resd_D2 and the first share switch SCS1 may be prevented from being damaged by static electricity.

Figure 12:
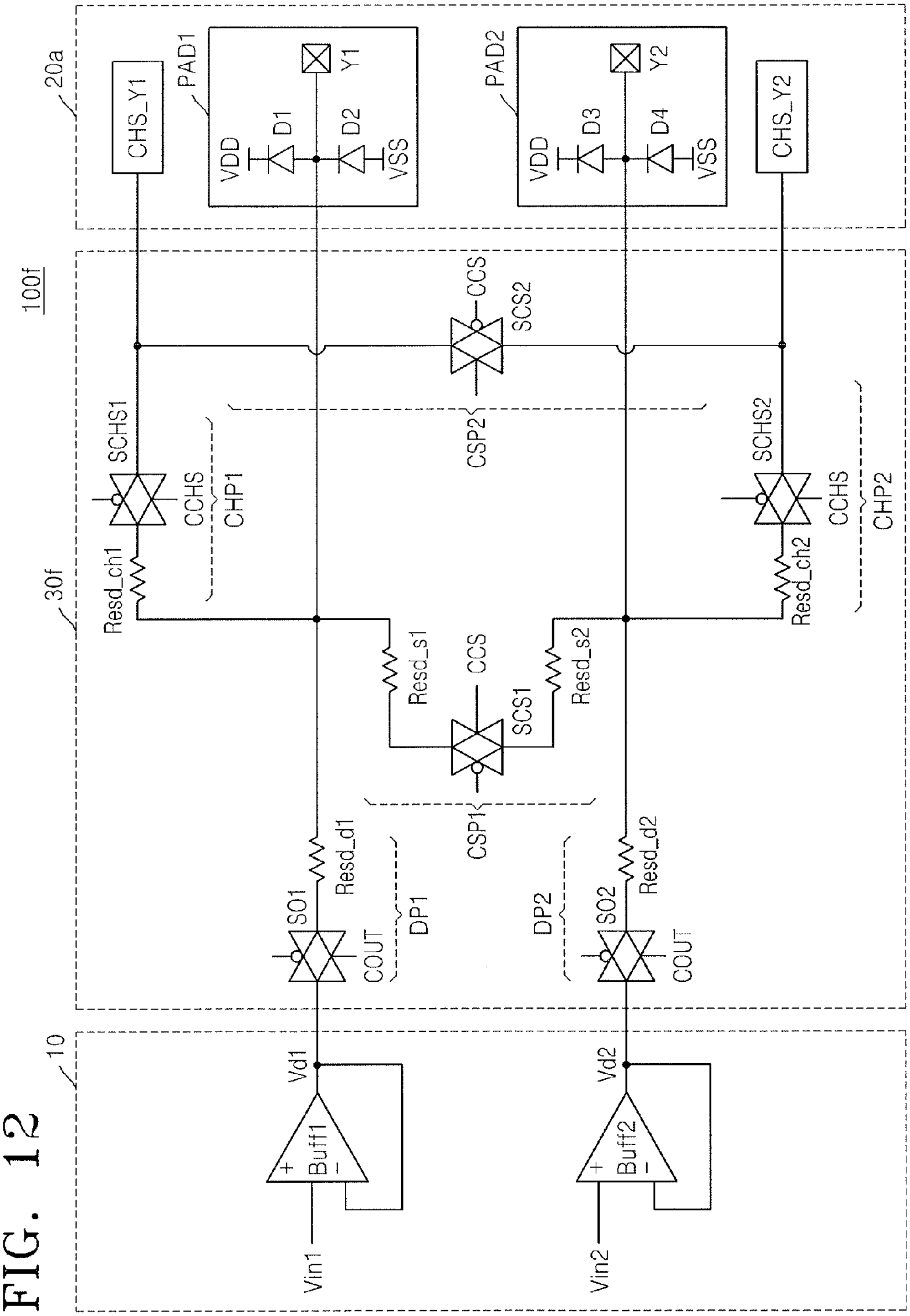
FIG. 12 illustrates a circuit diagram of a display driving device according to another embodiment of the inventive concept.

FIG. 12 is a circuit diagram of a display driving device 100*f* according to another embodiment of the inventive concept. The display driving device 100*f* illustrated in FIG. 12 includes substantially the same elements as those of the display driving device 100*d* illustrated in FIG. 7. Therefore, only differences between the output control unit 30*d* of FIG. 7 and an output control unit 30*f* of FIG. 12 will be described in detail below.

Comparing the display driving device 100*f* illustrated in FIG. 12 with the display driving device 100*e* illustrated in FIG. 11, first and second channel shift paths CHP1 and CHP2 are connected between first and second output pads PAD1 and PAD2 and first and second test pads CHS_Y1 and CHS_Y2, respectively. In addition, like in the first charge share path CSP1, the first and second channel shift paths CHP1 and CHP2 include third ESD protection resistors Resd_ch1 and Resd_ch2 separately from first and second data driving paths DP1 and DP2. The third ESD protection resistors Resd_ch1 and Resd_ch2 protect internal elements of the display driving device 100, for example, first and second channel shift switches SCHS1 and SCHS2, from static electricity. Since the third ESD protection resistors Resd_ch1 and Resd_ch2 are not related to the first and second data driving paths DP1 and DP2, even when resistances of the third ESD protection resistors Resd_ch1 and Resd_ch2 are increased, the output characteristics of the display driving device 100*f* are not directly affected. Thus, the output characteristics of the display driving device 100*f* may not be lowered, and the function of protecting against ESD may be improved.

Figure 13:
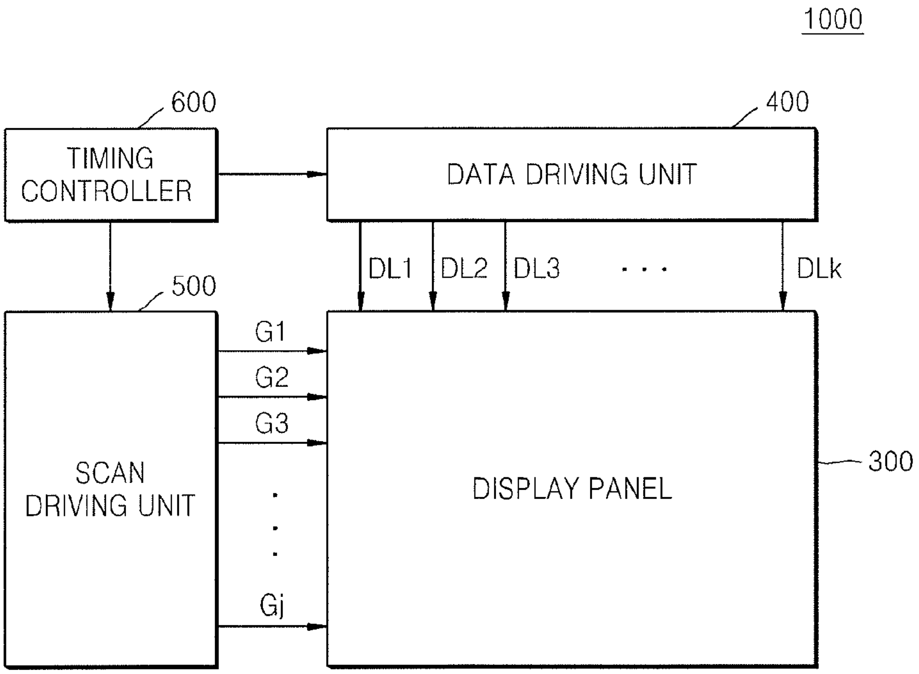
FIG. 13 illustrates a display system according to an embodiment of the inventive concept.

FIG. 13 illustrates a display system 1000 according to an embodiment of the inventive concept. Referring to FIG. 13, the display system 1000 includes the display panel 300, a data driving unit 400, a scan driving unit 500, and a timing controller 600. The display panel 300 may be a liquid crystal display (LCD) device. The timing controller 600 generates control signals for controlling the scan driving unit 500 and the data driving unit 400 and transmits image signals received from the outside to the data driving unit 400.

The scan driving unit 500 and the data driving unit 400 drive the display panel 300 in response to the control signals that are generated by the timing controller 600. The scan driving unit 500 sequentially applies scan signals to row electrodes of the display panel 300, and transistors that are connected to row electrodes to which the scan signals are applied, are increased as the scan signals are applied to the row electrodes thereof. In this regard, driving voltages DL1, DL2, . . . , and DLk that are supplied by the data driving unit 400 are applied to a liquid crystal via the transistors that are connected to row electrodes to which the scan signals are applied. The data driving unit 400 may be one display driving device among embodiments of the present invention described above. Thus, an ESD protection resistor is included in each of a data driving path between a buffer and an output pad and charge share paths between output pads so that the function of protecting against ESD is improved and output characteristics of the display driving device is not lowered. In addition, the charge share function may be improved by connecting share switches to be turned on, to channel shift paths in the charge share period. Thus, the function of protecting against ESD of the display system 1000 may be improved, and display quality may not be lowered.

The features of the inventive concept may be applied to at least one of flat display devices having a driving method similar to an LCD device, for example, an electrochromic display (ECD), a digital mirror device (DMD), an actuated mirror device (AMD), a grating light value (GLV) device, a plasma display panel (PDP), an electro luminescent display (ELD), a light emitting diode (LED) display, and a vacuum fluorescent display (VFD). An LCD device that is used according to the inventive concept may be applied to the fields of large screen TVs, high definition television (HDTVs), portable computers, camcorders, car displays, information communication multimedia, virtual reality, and the like.

By way of summary and review, in accordance with embodiments, a display driving device may include electrostatic discharge (ESD) protection resistors are disposed separately from data driving paths to improve a function of protecting against ESD, while maintaining output characteristics of the display driving device. In particular, an ESD may be provided in a charge sharing path as well as in data driving paths. Such an ESD in a charge sharing path may have an increased resistance without affecting output characteristics of the display driving device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display driving device, comprising:

a driving unit including a first buffer and a second buffer, wherein the first buffer and the second buffer generate a first driving voltage and a second driving voltage, respectively;

an output unit including a first output pad and a second output pad to which voltages are respectively applied and which output the voltages to outside;

a first data driving path and a second data driving path via which the first driving voltage and the second driving voltage are applied to the first output pad and the second output pad, respectively; and an output control unit, the output control unit including:

a first charge share path that connects the first output pad and the second output pad;

a first channel shift path via which the first driving voltage is applied to a first test pad;

a second channel shift path via which the second driving voltage is applied to a second test pad; and a second charge share path for connecting the first channel shift path and the second channel shift path, wherein each of the first data driving path and the second data driving path include a first electro-static discharge (ESD) protection element, and the first charge share path includes a second ESD protection element disposed separately from the first data driving path and the second data driving path.

2. The display driving device as claimed in claim 1, wherein the first ESD protection element and the second ESD protection element include resistors.

3. The display driving device as claimed in claim 2, wherein resistance of the second ESD protection element is equal to or greater than resistance of the first ESD protection element.

4. The display driving device as claimed in claim 2, wherein resistance of the second ESD protection element is variable.

5. The display driving device as claimed in claim 1, wherein:

each of the first data driving path and the second data driving path includes an output control switch that is turned on in a first operating period or a test period in response to an output control signal; and the first charge share path includes a first share switch that is turned on in a second operating period in response to a charge share signal.

6. The display driving device as claimed in claim 1, wherein the first charge share path includes two second ESD protection elements and a first share switch, and one end of each of the two second ESD protection element is connected to the first output pad and the second output pad, and the other end of each second ESD protection element is connected to the first share switch.

7. The display driving device as claimed in claim 1, wherein:

the first data driving path is connected between the first buffer and the first output pad;

the second data driving path is connected between the second buffer and the second output pad; and each of the first data driving path and the second data driving path includes an output control switch and a first ESD protection element that are connected in series.

8. The display driving device as claimed in claim 7, wherein each of the first data driving path and the second data driving path includes at least two pairs of an output control switch and a first ESD protection element that are connected in series.

9. The display driving device as claimed in claim 1, wherein the output control unit further comprises:

a third data driving path via which the first driving voltage is applied to the second output pad; and a fourth data driving path via which the second driving voltage is applied to the first output pad, and wherein the third data driving path and the second data driving path share the first ESD protection element of the second data driving path, and the fourth data driving path and the first data driving path share and the first ESD protection element of the first data driving path.

10. The display driving device as claimed in claim 1, wherein:

each of the first channel shift path and the second channel shift path includes a channel shift switch that is turned on in a test period and a second operating period in response to a channel shift signal; and the second charge share path includes a share switch that is turned on in the second operating period.

11. The display driving device as claimed in claim 1, wherein each of the first output pad and the second output pad comprises:

an output pin for connecting an internal circuit and an external circuit;

a first ESD protection diode that is connected between the output pin and a first power supply voltage; and a second ESD protection diode that is connected between the output pin and a second power supply voltage.

12. The display driving device as claimed in claim 1, wherein the second charge share path is for connecting the first test pad and the second test pad.

13. The display driving device as claimed in claim 1, wherein the second charge share path is to selectively electrically connect the first channel shift path and the second channel shift path.

14. A display system, comprising:

a display panel in which a plurality of scan lines and a plurality of data lines cross one another in a vertical direction, and a switching element and a pixel cell electrode are arranged at each portion where the plurality of scan lines and the plurality of data lines cross one another;

a scan driving unit for applying scan signals to the plurality of scan lines; and a data driving unit for applying driving voltages to the plurality of data lines, wherein the data driving unit includes:

a plurality of buffers for generating and outputting driving voltages;

a plurality of output pads to which voltages are applied and which output the voltages to the plurality of data lines;

a plurality of data driving paths via which the driving voltages that are output from the plurality of buffers, respectively, are applied to the output pads in a data driving period or a test period;

a plurality of channel shift paths via which the driving voltages that are output from the plurality of buffers, respectively, are applied to test pads in the test period;

a plurality of first charge share paths for connecting the plurality of output pads to each other in a charge share period; and a plurality of second charge share paths for connecting a pair of adjacent channel shift paths among the plurality of channel shift paths in the charge share period, each of the plurality of second charge share paths including a second share switch.

15. The display system as claimed in claim 14, wherein each of the plurality of channel shift paths includes:

a channel shift switch that is turned on in a test period or a charge share period in response to a channel shift signal;

each of the plurality of first charge share paths includes a first share switch that is turned on in the charge share period in response to a charge share signal; and the second share switch included in each of the plurality of second charge share paths that is turned on in the charge share period in response to the charge share signal.

16. The display system as claimed in claim 14, wherein the plurality of channel shift paths, the plurality of first charge share paths, and the plurality of second charge share paths include switches, respectively, and the switches are turned on in the charge share period and perform a charge share function.

17. A display driving device, comprising:

a driving unit generating a first driving voltage and a second driving voltage;

an output unit including a first output pad and a second output pad to which voltages are respectively applied and which output the voltages to outside;

a first data driving path and a second data driving path via which the first driving voltage and the second driving voltage are applied to the first output pad and the second output pad, respectively, in a first operating period; and an output control unit, the output control unit including:

a first charge share path that connects the first output pad and the second output pad in a second operating period;

a first channel shift path via which the first driving voltage is applied to a first test pad in the output unit in a test period;

a second channel shift path via which the second driving voltage is applied to a second test pad in the output unit in the test period; and a second charge share path for connecting the first channel shift path and the second channel shift path in the second operating period, the second charge share path including a share switch, wherein the first charge share path includes an electro-static discharge (ESD) protection element disposed outside the first data driving path and the second data driving path.

18. The display driving device as claimed in claim 17, wherein:

the first charge share path includes two ESD protection elements and a first share switch, a first end of each of the two second ESD protection element is connected to the first output pad and the second output pad, and a second end of each second ESD protection element is connected to the first share switch.

19. The display driving device as claimed in claim 18, wherein:

each of the first channel shift path and the second channel shift path includes a channel shift switch that is turned on in a test period and a second operating period in response to a channel shift signal; and each of the first charge share path and the second charge share path includes the share switch that is turned on in the second operating period.

20. The display driving device as claimed in claim 17, further comprising an ESD in each of the first and second data driving paths, an ESD in the first charge share path having a higher resistance than that of ESDs in the first and second data driving paths.

* * * * *